United States Patent [19]
Ugon et al.

[11] Patent Number: 5,442,645
[45] Date of Patent: Aug. 15, 1995

[54] METHOD FOR CHECKING THE INTEGRITY OF A PROGRAM OR DATA, AND APPARATUS FOR IMPLEMENTING THIS METHOD

[75] Inventors: Michel Ugon, Maurepas; André Oisel, Elancourt, both of France

[73] Assignee: Bull CP8, Trappes, France

[21] Appl. No.: 328,963

[22] Filed: Oct. 24, 1994

Related U.S. Application Data

[63] Continuation of Ser. No. 646,638, Feb. 26, 1991, abandoned.

[30] Foreign Application Priority Data

Jun. 6, 1989 [FR] France ................... 89 07429

[51] Int. Cl.⁶ .................. G01R 31/28; G06F 11/00; H04L 9/00
[52] U.S. Cl. .................. 371/25.1; 371/22.4; 380/29
[58] Field of Search .......... 235/380, 381, 382, 382.5; 380/28, 29, 30, 42; 371/22.4, 25.1, 54, 53; 364/222.5, 225.2

[56] References Cited

U.S. PATENT DOCUMENTS

| | | | |
|---|---|---|---|
| 4,438,824 | 3/1984 | Mueller-Schloer | 235/380 |
| 4,723,284 | 2/1988 | Munch et al. | 380/25 |
| 4,802,217 | 1/1989 | Michener | 380/29 |
| 4,816,654 | 3/1989 | Anderl et al. | 235/380 |
| 4,944,007 | 7/1990 | Austin | 380/21 |
| 4,993,068 | 2/1991 | Piosenka et al. | 380/23 |
| 5,081,626 | 1/1992 | Scott | 371/22.4 |
| 5,097,504 | 3/1992 | Camion et al. | 380/23 |

OTHER PUBLICATIONS

Smartcards Outsmart Computer Crime, Ken J. Fifield, Computer & Security, vol. 8 (1989) pp. 247–255.

Primary Examiner—Robert W. Beausoliel, Jr.
Assistant Examiner—Trinh Tu
Attorney, Agent, or Firm—Weingarten, Schurgin, Gagnebin & Hayes

[57] ABSTRACT

The invention relates to a method and apparatus for checking the integrity of a message such as a program and/or data against an original message supposed to correspond to it.

By using an algorithm (A) on at least part of the original message, at least one signature (S1, S2, . . . Sm) of this part is calculated and memorized in a memory area (10) of a portable object (1) which also has processing circuits (11) able to implement algorithm (A). In order to check the integrity of a message, at least one signature of a message part is calculated by the processing circuits (11) of the portable object by implementing the algorithm (A) and is compared to an original message signature supposed to correspond, and memorized in memory area (10).

22 Claims, 3 Drawing Sheets

METHOD FOR CHECKING THE INTEGRITY OF A PROGRAM OR DATA, AND APPARATUS FOR IMPLEMENTING THIS METHOD

This application is a continuation of application Ser. No. 07/646,638, filed Feb. 26, 1991, now abandoned.

The invention relates to a method for checking the integrity of a program or data, and a apparatus for implementing this method. It checks to see that information such as data that must remain constant from one use to another of a data-processing system, and which are memorized on a storage medium, at specific locations on this medium, or information constituting the operating instructions of a computer program, also called software, have not been altered deliberately or accidentally between successive uses. In order for a program to operate correctly, its instructions (or necessary data between two successive uses) must not be improperly altered.

Indeed, since the use of computers has become widespread, any user can access the application programs or the operating systems of computers.

Because of this widespread access, users commit manipulation errors which result in alteration of a program or the data necessary for operation of the data-processing system, or some ill-intentioned persons deliberately modify the structure of programs or the contents of the data in a data-processing system in order to disrupt operation of the system. In the latter case, the problem is even more crucial than in an alteration caused by error, since deliberate tampering may consist of introducing into the program, or into the data, parasitic elements such as instructions which, when handled by the program, cause it gradually to self-modify, possibly to the point of complete self-destruction.

Moreover, most programs are now copy-protected, and for this purpose contain means that, after copying, cause the copy or the original to be contaminated and/or to degenerate further and further with successive uses. This may pose a problem when a user purchases a pirate copy in good faith, and the software quickly becomes unusable.

This type of software or data contamination causes progressive deterioration of the software and is far more difficult to detect than contamination causing an immediate software malfunction. The latter type of contamination, causing an immediate malfunction, is quickly noticed since in general it gives aberrant processing results.

On the other hand, contamination causing gradual degeneration, particularly when brought about with harmful intent, is not necessarily detectable merely by reading the printout, since it may be introduced in such a way that the output from the initial use is correct, or at least appears to be, and detectable errors emerge only after a number of uses.

A final type of contamination can occur which, after a correct program has been loaded for execution, particularly when the system is operating as part of a network, can cause parasitic instructions to be inserted or substituted for some of the normal operating instructions of the software. This can be done remotely, for example via transmission lines.

In this case, the user who loaded the program, even if he knows that the original program he loaded is correct, cannot necessarily detect external tampering, so that he runs the program which immediately yields aberrant results.

The instructions or data used in a data-processing system are coded in the form of binary words, each having a given number of bits. One usual format is the byte, or a word containing eight bits which can be in logic state "0" or "1." Depending on the type of instructions or data, it may be necessary to use several words for a single instruction or datum; a program is composed of a sequence of these words, The alterations mentioned above may consist either of adding binary words, namely parasitic instructions or data, or changing the state of one or more bits of certain words in the original program.

A first known solution for detecting alterations, which may be satisfactory when an instruction or datum has been changed accidentally, consists of signing the software, i.e., one or more binary words following instructions or data constitute the software or data signature. For this purpose, one may look at the original program as a message M which has undergone a transformation $S = f(M)$, where the result S is a signature which is placed in a given location in the program. For example, the signature may be the last word of the program.

In order to check the signature when the program is eventually loaded for use, the signature of the loaded program is recalculated and compared with the signature memorized on the storage medium. If there is a match, this means that the original has not been altered.

However, in the case of tampering, a competent hacker who knows the function or algorithm used to calculate the signature may arrange for the signature memorized to be altered upon each illicit intrusion so that, upon the next use, tile recalculated signature and the signature most recently memorized on the program or data storage medium match. Thus, a person responsible for checking a signature match by using the message conversion algorithm will find a match and not discover the tampering.

Moreover, this method is difficult to apply if the program is a long one, since each signature calculation for checking purposes takes a certain amount of time during which the program cannot be used for its intended purpose.

The goal of the invention is to overcome these drawbacks by proposing a method and a system allowing rapid and reliable checking under all circumstances that a program or data match and have not been tampered with between two uses.

According to the invention, a method for checking the integrity by comparison to an original message, of a message containing information such as instructions in a program or computer data, of the type causing processing circuits to calculate a signature from this message, is characterized by consisting of having the processing circuits take into account at least part of the message, and, with the aid of an algorithm executed by the processing circuits, having at least one signature created as a function of said message part; by consisting of associating, with the original message, a portable electronic object containing processing circuits and at least one memory area accessible only by the processing circuits of the object; by consisting of memorizing in this memory area, each of the previously calculated signatures under the control of the processing circuits of the object; by consisting, with the aim of checking the integrity of a message, of having the processing circuits of the object recalculate at least one signature, without disclosing it to the outside, using the same algorithm used to calculate the signatures before memorization, and the same message part that served as a basis for calculating the signatures memorized; and by consisting of having the processing circuits of the object compare each recalculated signature with the corresponding memorized signature, and indicating to the user whether there is a match or a difference between each signature memorized and each corresponding recalculated signature.

The invention is thus particularly advantageous since it can be implemented at any time in the life of the program or data. This is because memorization of the signatures within a portable object, which can advantageously be a device of the memory card type with electronic microcircuits, can be effected at any time by any user who wishes to protect himself. This may be done by the designer, in which case the portable object is supplied with the program; or it may be done by a user who wishes to check that his program has remained intact through multiple uses. In such a case, the user procures a specific virgin portable object and runs the signature calculating program when he wishes to memorize the signatures; then, using this portable object, he may from time to time check the integrity of the program.

Moreover, since calculation of the signatures with a view to comparing them to the signatures originally stored takes place inside the portable object, and since the signature match is checked by extracting signatures memorized in an area accessible only to the processing circuits of the portable object, it is impossible for a hacker to defeat the system. This is because the circuits of the portable object recalculate each signature and send the signatures to the comparison circuits which are accessible only under the control of the processing circuits. Hence, if the message is not intact, it is impossible to send a false signature to the address of the comparison circuits, so that any modification or intrusion is immediately detected.

According to one embodiment, a secret key, required for calculating the signatures to be memorized, is used when these signatures are created, and is memorized in the memory of the portable object in the same way as each calculated signature. The secret key can be a random number furnished at the time of signature calculation and destroyed following this calculation after memorization in the portable object.

In one embodiment, the secret key used to calculate the signatures with a view to their memorization is pre-stored in the portable object, for example in its personalization phase, and is inaccessible from outside the portable object; the processing circuits of the portable object itself carry out the first signature calculation with a view to signature memorization, using this pre-stored key.

Other characteristics and advantages of the invention will emerge from the description below, which refers to FIGS. 1 to 6 attached illustrating the principle and certain embodiments of the present invention.

DETAILED DESCRIPTION

FIGS. 1A to 1D illustrate the structure, known of itself, of an information sequence to which the present invention may apply.

Figure 1A:
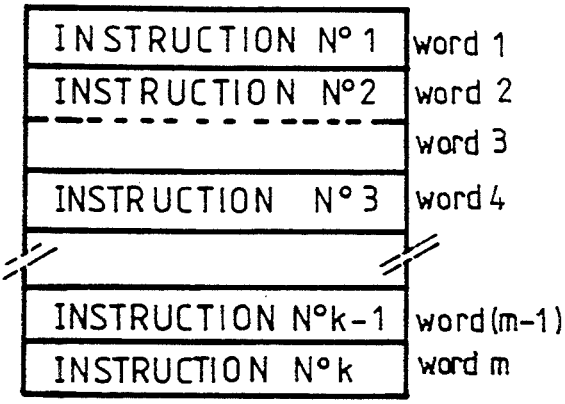
FIGS. 1A to 1D are structures of an information sequence of the present invention.

FIG. 1A illustrates a typical program structure. A program is composed of a series of instructions, numbered 1 through k in the example, coded in binary form, by means of words each findable by their addresses. In the example illustrated, the program has m binary words, whereby m can be greater than or equal to k. Depending on the type of instructions, coding of one instruction can affect several binary words. This is what is illustrated in FIG. 1A where instruction No. 2 is coded on two words, words 2 and 3. In a structured data-processing system, each word generally has a given number of bits n, which is generally the size of a byte, i.e. eight bits, or a plurality of bytes. Of course, this is not limiting and the invention could also apply to any other program structure in which the word format may vary from one program to another.

A program structured in this fashion, with words of the same length, i.e. n bits, if taken in a given order constitutes a message of total length $L = m \times n$, expressed in bits. In general, the total message length is of the sum of are the bits constituting all of the words that makes up the sequence of instructions.

Figure 1B:
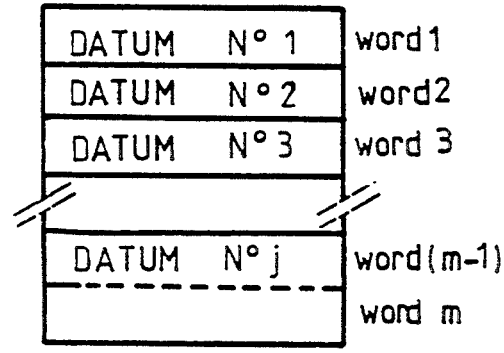

The invention also applies to checking the integrity of data sequences, as illustrated in FIG. 1B. It may be necessary to check the integrity of data that may be used repetitively, for example those necessary for running a program.

The data may be independent of the program, as illustrated in FIG. 1B which shows a set of m words of n bits containing a number of data j.

Like the instructions, the data may be coded on several binary words, which explains why the number of data j may be different from the number of words containing these data, m, i.e. j can be less than or equal to m.

Figure 1C:
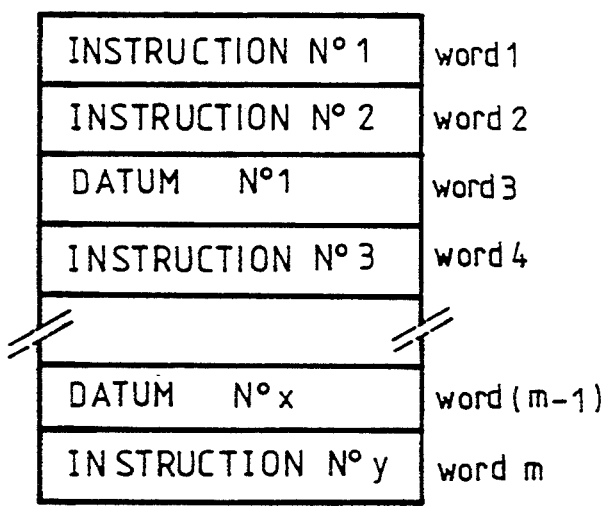

FIG. 1C illustrates a particular example of a program in which instructions and data are mixed (x data and y instructions).

It should be noted in general that an instruction can be considered to be a particular form of a datum.

In general, a program is stored in a particular storage medium, for example in the CPU of a computer or on a hard disk containing the microcomputer programs. It may also be used directly from the original storage medium such as the diskette on which it was stored to begin with. Non-integrity of the program, whether deliberate or not, will result in a change in one of the words as stated previously.

Figure 1D:
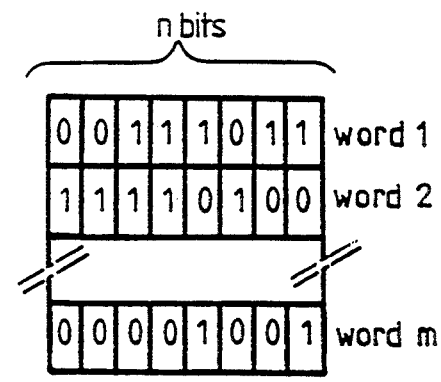

FIG. 1D shows that a word is in fact composed of a set of bits which may take the value "0" or "1", and the change in a word results in a change in state of at least one of the bits. Another modification may consist of superimposing parasitic instructions or data on the original instructions or data. This may occur when the program is loaded onto a medium other than its original storage medium, for example when the program is stored on a hard disk for use from this hard disk.

When a parasitic or modified instruction or datum is read, uncontrollable phenomena may thus occur.

The present invention consists of considering that the sequence of instructions or data (which will henceforth be referred to by either term, or by the term information, since the invention applies to checking the integrity of programs and/or of data) constitutes a message of length L expressed in bits, where the value of L is equal to the number of bits in the message.

A first solution, applicable directly to small messages, consists of precalculating an electronic signature of the message using a message conversion A, which algorithm can also take into account at least one secret key, and then storing the signature S obtained in the electronic memory of a microcomputer card possessing the algorithm used to precalculate the signature. The portable object also has a memory area accessible only by the processing circuits it that contains the secret keying if a key was used upon signature precalculation.

At the time the integrity of a message is checked, the user connects the portable object to the system containing the program and runs a checking program which causes the processing circuits of the portable object to recalculate another signature with the aid of the algorithm it contains, and with the aid of the secret key if any, taking into account the sequence of bits constituting the message to be checked.

The recalculated signature is then compared, using the processing circuits of the portable object, to the signature initially calculated and stored in the memory of the portable object and accessible only by the processing circuits of the latter. If the message that served as a basis for calculation of the first signature is identical to the message used for checking, i.e. in the case when the program and/or data have not been altered, the signature recorded in the memory of the portable object will be identical to the recalculated signature, which may be indicated to the person conducting the check.

Another advantage of the invention will immediately be apparent: since the signature calculated for checking is calculated by the processing circuits of the portable object and is compared inside the portable object by the same processing circuits, it becomes impossible to simulate a false signature since this would not be taken into account by the processing circuits, contrary to the case in the prior art where a hacker could attach to the program and/or data a false signature corresponding to the altered program or data.

Figure 2:
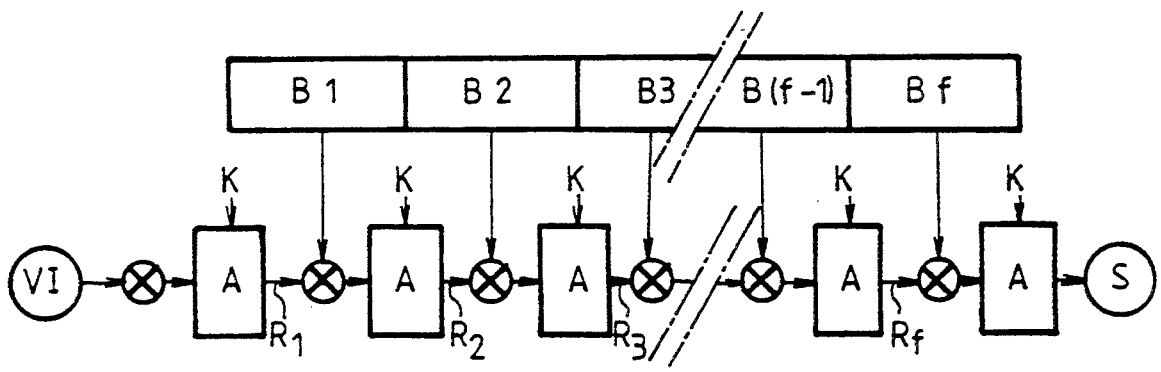
FIG. 2 is an apparatus for calculating a signature.

FIG. 2 illustrates the principle of an embodiment of the present invention with a view to calculating the signature to be stored in the memory of the portable object to be used for checking, using a secret key K.

Message M of length L is divided for example into unit blocks B1, B2, . . . Bf, each of which contains a number of bits compatible with the working format of the processing circuits that calculate the signature. For example, each block may contain one bit, but in modern processing circuits, each block would instead be composed of a number of bits that is a multiple of a byte. First block B1 may for example be composed of the first message word serving as a basis for the signature, second block B2 may be the second message word, and so forth to last block B f which is composed of the last word of the message. Of course, a hacker's job may be complicated by using a calculation algorithm considering the words, or even the bits in each word, in a different order from the order in which they appear in the storage medium where they are stored.

The principle consists of calculating a signature whose format is usable directly by the processing circuits of the portable object while the number of bits constituting the message may be distinctly larger than the number of bits corresponding to the circuit processing format.

The principle illustrated in FIG. 2 consists of performing as many operations as there are blocks, and combining the result of each of these operations in order to obtain a signature S having a limited number of bits (s). An initialization value VI may be applied to the input of the processing circuits using algorithm A, and secret key K is applied to another input of the same circuits, so that application of secret key K and initialization value VI produces a first intermediate result which is combined with the contents of first block B1, for example via an EXCLUSIVE OR function. The result of the conversion is produced by means of the EXCLUSIVE OR which is then applied to a first input of the processing circuits taking the algorithm into account, with the second input using secret key K, so that a second intermediate result is obtained at the output of the processing circuit, which is combined with the contents of second block B2 through the same conversion function, i.e. the EXCLUSIVE OR.

The same applies to each block in turn up to final block Bf, whose contents are combined through the EXCLUSIVE OR function with a prior result Rf obtained by the processing circuits, by application of algorithm A to secret key K and to the result of the previous EXCLUSIVE OR. The result obtained from the EXCLUSIVE OR applied to the contents of block Bf and to previous result Rf is combined with key K through algorithm A in the signature calculation circuits, and the result of the latter combination constitutes signature S.

Of course, initialization value VI must be the same as that serving for later calculations, so that checking is possible.

When signature S has been calculated, it is stored in the memory of the portable object in order to serve as a reference for later checking. When the integrity of a message is to be checked before use, one need then only use the portable object to check that the signature calculated is indeed the same as the signature stored inaccessibly, other than by the processing circuits, in the memory of the portable object.

An initialization value VI may be composed of a value contained in the portable object, for example its serial number. It may also be a confidential code entered by the person starting calculation of the signature to be memorized, and then provided to other users who may have to check integrity of the message. Finally, initialization value VI may be the contents of a particular memory register of the portable object, whose contents are identical at each use of the portable object. Value VI may also be a random number determined by the processing circuits at the time the signatures are calculated before memorization, and then memorized at the same time as the signatures.

The embodiment illustrated in FIG. 2 is only an example, and the algorithm may of course be used differently; one may also refrain from using an initialization value and from using secret key K, or functions other than the EXCLUSIVE OR function envisaged may be used.

The memory of a portable object intended for checking the integrity of a message contains at least one signature S, and the portable object also has processing circuits such as a processor, and a conversion algorithm A.

The portable object is designed so that the message to be checked can be sent to the processing circuit of the portable object. The portable object may also contain a secret key K and in this case a signature is the result of a calculation.

Figure 3:
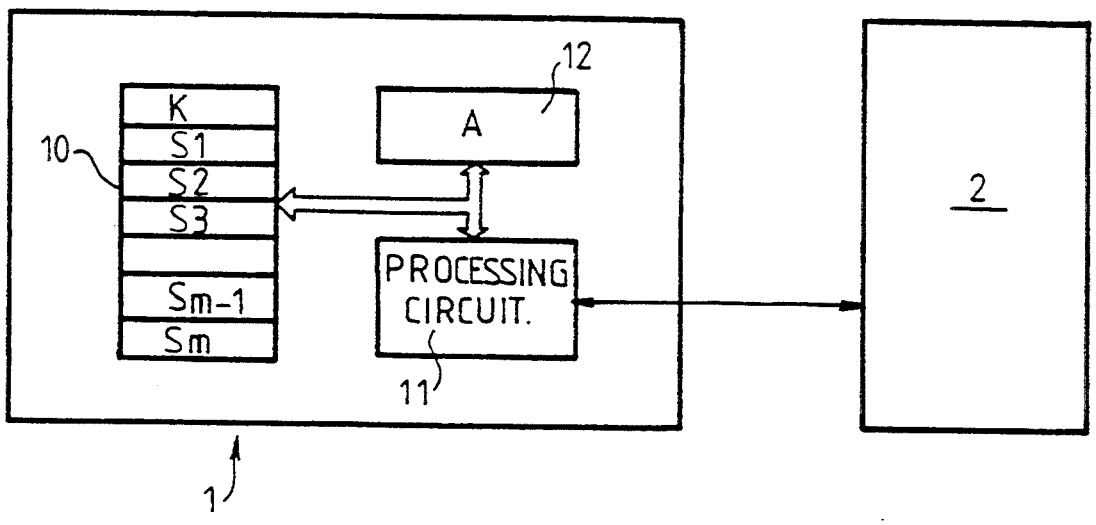
FIG. 3 is an apparatus for checking integrity of a message against an original message.

FIG. 3 illustrates an improved embodiment of a portable object 1 containing several signatures S1, S2, ... Sm as well as a single secret key K in its non-volatile memory area 10 accessible only by processing circuits 11 of the object. Each signature is in fact the signature of a different message, and was obtained from the same secret key K. This configuration is used when a single software vendor provides several programs to the same user. In this case, the signature of each program can be stored in the same portable object.

In addition, algorithm A is memorized in another area 12 of the object.

This may also be the case when a user who desires protection uses a specific portable object, originally containing a secret key K, in which he has memorized the signatures of each of the programs and/or data storage media he possesses.

In such a case, where a single portable object contains the signatures of several messages, each signature must be associated with means for identifying the original message so that, at the time the signature is checked, the processing circuits of the portable object can find in memory the signature of the original message which is supposed to match the message being checked. To accomplish this, a serial number or another identifier is associated with each original message at the time a signature is precalculated with a view to memorization. A datum corresponding to this serial number or identifier is memorized in the portable object at the time the corresponding signature is memorized so that the processing circuits of the portable object are able to correlate an identification datum with the corresponding signature.

The serial number, or identifier, may be determined either by the user who wishes to precalculate a signature with a view to memorization or by the processing circuits of the portable object itself.

It is of course possible for a portable object not to be used alone, in which case, as in all the variants illustrated below, it must be coupled by coupling and/or interface circuits with a larger system 2, particularly with the data-processing system in which the original message (program or data) is to be processed. This data-processing system is generally part of a computer and has at least one keyboard and printing and/or display means. The coupling and/or interface circuits allow a dialog to be established between the processing circuits of the portable object and the processing circuits of the larger system.

If it is the user who determines the serial number or identifier of a program, he enters it into the system, for example via the keyboard of the larger processing system. When the processing circuits of the portable object determine the corresponding datum, however, the user is informed of the serial number or identifier associated with the original message whose signature he will precalculate, following a dialog established between the processing circuits of the portable object and those of the larger system, or by the display means of this system, or by the printing means.

Whatever the variant used, the user must keep a record, on a different storage medium, of the identifier or serial number corresponding to a given original message, and at the time a checking signature is calculated, must inform the system using a keyboard or other data entry means so that the processing circuits of the portable object will compare the signature only to the signature in memory supposed to correspond to it.

A signature may be calculated, with a view to memorization, in the circuits of memory 10 of a portable object, either directly from processing circuits 11 of the portable object itself and the secret key it may contain following manufacture, which is highly advantageous since the signature can be calculated without ever being disclosed outside, since as soon as the processing circuits have completed the calculation they will memorize the signature. Alternatively, the first signature calculation, before memorization, may be carried out by processing circuits outside the portable object and built into an outside system 2 to which portable object 1 may be connected. Outside system 2 is, for example, a processing unit for the program or data to be checked. These outside circuits use the same algorithm as that contained in the portable object. In such a case, if the calculations use a secret key, it may be determined at the time each signature is calculated and memorized simultaneously therewith, or the secret key can be taken from inside the portable object, under the control of the processing circuits therein, then transmitted to the outside circuits with a view to calculating the signature before the key is memorized. This solution has, however, the disadvantage that the secret key must be transmitted outside and it must consequently be deleted from the outside processing circuits after signature calculation. This solution is however advantageous when longer programs require fairly long processing times for signature calculation. The processing time of the microprocessor CPU may be an obstacle to utilization of the process in that the signature is calculated on the basis of the entire message of which the program and/or data is/are composed. For a one-megabyte program, it takes more than an hour to obtain the result of signature calculation, and hence the result of the check, since the processing circuits built into the usual portable objects such as microcircuit cards have far shorter processing times than the processing times of more powerful computers.

Long processing times for checking may be totally unacceptable for frequent use. For this reason, in another variant, a far faster checking process than the preceding process is proposed, usable in all the cases at issue. Here, the message is pre-divided into a certain number of parts or modules M1, M2, ... Mm, a signature S1, S2, S3, ... Sm is associated with each module, and each signature is memorized in a different secret area of the portable object. Depending on the size of the message for which signature S1, S2, S3, ... Sm, etc. is to be calculated before storage, calculation is carried out either by the processing circuits of the portable object in the case where the message is not too long, or if the size necessitates too long a calculation time, the calculations are performed by faster processing circuits, for example those of a computer to which the portable object is coupled during the signature calculation phase.

It should however be noted that, during the signature calculation phase, with a view to signature storage in memory 10 of the portable object, the calculation time is not critical, so that to avoid disclosing the secret key to the outside, the solution by which calculation is performed by processing circuits 11 of the portable object itself is preferred.

It will be seen that the total message served as a basis for creating a number of signatures, so that all the bits of which the message is composed were taken into account. In such a case, it is possible to use several methods to check the integrity of the message on which creation of several signatures was based.

A first method consists of randomly choosing several different modules p from the set of modules m representing the entire program to be checked. The number p may be predetermined and constant with each check, whereby the processing circuits confine themselves to choosing different modules for checking, and are designed for the option of the chosen modules being different from one check to the next.

For determining the modules, the processing circuits of the portable object use the same method as that used to determine the m modules used for the initial calculation of the m signatures. Thus, if at the time of the original calculation the message was divided into modules of k bits, at the time of signature checking the processing circuits of the portable object re-divide the message they receive into modules of k bits and randomly choose from these modules a number p of modules for which the signature can be checked. The processing circuits of the portable object then calculate the signatures of the p modules chosen and compare them to the signatures that are supposed to correspond, in the card memory.

The comparison can be done on the spot, i.e. as soon as the card has recalculated a signature, it checks whether this signature matches the signature in memory supposed to correspond to it. Alternatively the set of recalculated signatures can be stored in a buffer memory, the comparison then taking place after the p signatures have been recalculated.

As soon as the processing circuits of the portable object detect a difference between a recalculated signature and the signature in the memory of the portable object that is supposed to correspond, the message is deemed not to be intact and means associated with the processing circuits, such as the display means of the system with which the portable object is connected, indicate the positive or negative result of the comparison.

Thus, for example, if the original message was divided into eight-bit modules, the first module being composed of the first eight bits of the message, the second module being composed of the next eight bits, and so forth, the recorded signature of the first module corresponds to calculation of the first eight bits, and the signature of the second module corresponds to calculation of the ninth to sixteenth bits of the initial message. If, upon signature checking, the processing circuits decide to check the signature of the second module, the processing circuits will take into account the second series of eight bits of the message whose integrity is to be checked, recalculate the signature of this second eight-bit series of the message to be checked, applying algorithm A to this eight-bit series, possibly applying a secret key K if this was used in the calculation before memorization, and the signature stored in the memory of the portable object corresponding to the second initial module is compared to the recalculated signature of the module which is supposed to correspond.

Of course, if the p recalculated signatures are correct, even though m-p signatures were initially and stored in the memory of the portable object but were not checked, the system considers the program to be intact and a positive result of the comparison is displayed.

The number of modules p for which the portable object must check the signatures may be predetermined, while the checked modules may be different from one check to the next. The number of modules to be checked p is indicated to the processing circuits of the portable object and is chosen such that the thoroughness of the check is sufficient to reach an acceptable confidence level: Since p signatures are checked instead of the original m signatures, the calculation time required for checking is reduced consistently by comparison with the calculation time that had been required to memorize all the signatures.

Also, the number of modules p may not be determined in advance, but may be chosen randomly by the processing circuits of the portable object. In this case, the value of the calculated number p must be checked to prevent checking from covering too small a number of modules, weakening the validity of checking. Also, the number p must not be too high, to keep processing times within acceptable limits.

Figure 4:
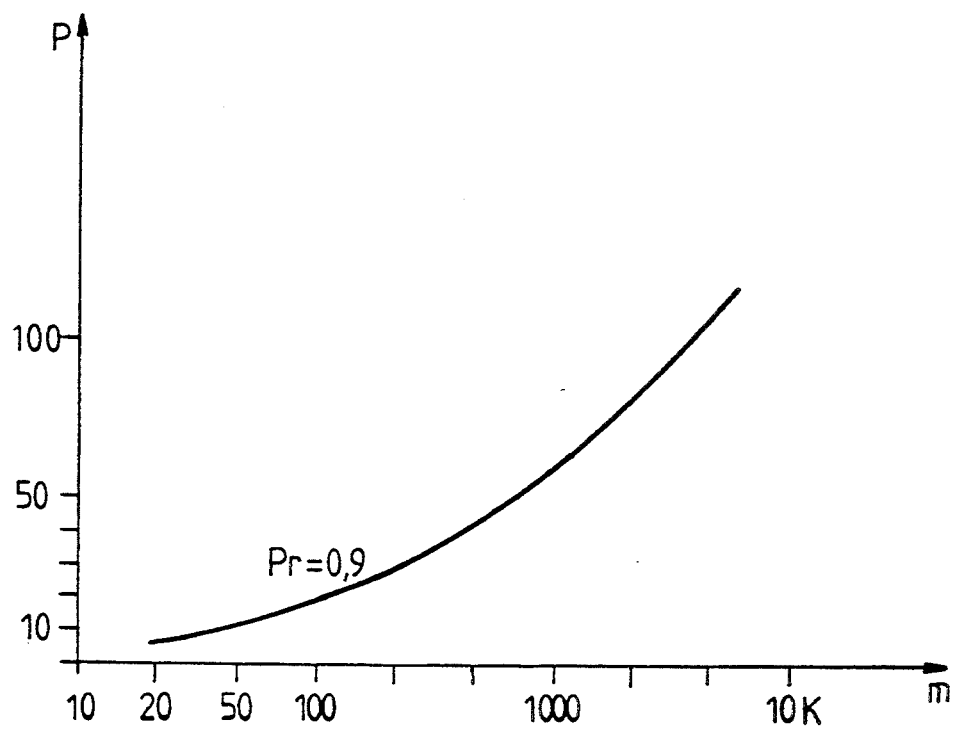
FIG. 4 is a curve of the total number p of modules that must be check vs. the total number m of modules that message contains.

FIG. 4 is a curve showing the number p of modules that must be checked as a function of the total number m of modules the message contains, yielding a probability Pr of 0.9, meaning that it shows the number of modules that have to be checked if one is to have nine chances out of ten of detecting a message alteration in the case where, moreover, the message contains a number q of altered modules that is equivalent to the number p of checked modules. Thus, for a program containing a thousand modules of which about sixty would be altered, sixty modules would have to be checked for the odds of detecting a message alteration to be nine out of ten.

In other words, this means that if about sixty module signatures were to be checked out of a message containing a thousand modules, and less than sixty modules had been altered, the probability of detecting an alteration after these sixty checks is greater than 9/10 and declines if the number of altered modules is higher.

To determine the number p of modules that must be checked, a compromise must accordingly be made between the number q of modules that may have been altered and the total number m of modules containing the message.

Assuming that each module is findable by a serial number, as stated above, the random choice of the p modules for which signature checking is to be done may consist of having the processing circuits of the portable object produce p different random numbers, each determining the serial number of the module chosen.

Thus, assuming that four checks are to be run on a set of m modules, the processing circuits of the portable object will randomly draw four different numbers less than or equal to m. If, for example, the calculation gives the numbers 2, 4, j, m-l, then the processing circuits of the portable object will calculate the signatures of the second, fourth, j-th, and m-lth modules of the message whose integrity is to be checked, and will compare them to the second, fourth, j-th, and m-lth signatures memorized in the memory of the portable object.

Following the comparison, the processing circuits of the portable object will act on means showing whether a difference, or whether a similarity, has been detected in the various comparisons.

In one variant, to determine what modules should be signature-checked, the processing circuits of the portable object are made to calculate a binary number (a) of length m, i.e. having a number of bits equal to the number of modules of which the message is composed. Matters are arranged such that the binary number comes from a code p out of m, namely it has a certain number p of bits in a given logic state, while the remaining m-p bits are in a complementary logic state. For example, if the initial state of the bits is logic state "0," generation of the number (a) will cause p bits to be in a different state from the initial state. Since each bit can be detected by its serial number in the set of m bits, the modules chosen for signature checking will be those whose serial numbers correspond to the serial numbers of the bits that have changed to "1" in the random binary number (a).

Yet other possibilities can be envisaged by the individual skilled in the art without thereby departing from the scope of the present invention.

The variants described above may prove adequate and offer a satisfactory degree of security to determine, with a good probability, whether or not a message has been altered. However, other variants for improving the security of the method may be envisaged.

These improved variants are based on the fact that tampering generally consists of modifying a sequence of sequential instructions in the program, or introducing fairly localized and infrequently used parasitic sequences. It is only when the program uses these parasitic instructions as it runs that the effects of their presence may prove disastrous. These parasitic instructions may actually not be called up by the program under certain utilization conditions, but will be under other conditions.

This is why, in order to improve the probability of detection of a very infrequently used local modification, in one embodiment, prior to signature calculation, the algorithm employed in the processing circuits of the portable object organizes division of the message into blocks, regardless of their content, and organizes interlinking of the blocks in the signature calculations so as to make any consistent modification of the message impossible. A set of interlinked blocks forms a module.

Thus it may be considered that each unitary binary word constituting the message, constitutes a block. In such a case, if the working format of the processing circuits is the byte, each block will be composed of eight bits.

In one variant, a block is considered not to be composed of a single binary word, but for example of several consecutive binary words in the sequence of the message. Thus, a first block may be formed for example from the first hundred binary words, i.e. the first hundred words of the message whose integrity is to be checked, each having a given number of bits, eight or sixteen for example, or any other value compatible with the working formats of the processing circuits of the portable object; the second block will be composed of the next hundred binary words, and so forth to the end of the message.

Of course, it may be that the total number of words in the message will not allow a last block to be formed with the same number of binary words belonging to the message as in the previous blocks. This is the case when the total number of words in the message divided by the number of words chosen to form each block does not give a whole number. In such a case, the last block cannot contain a number of words coming from the message that is equal to the number contained in the previous blocks.

This is the case, for example, when a message contains one thousand and thirty words and each block is composed of a hundred words. Ten blocks of a hundred words may be formed, and only thirty words are left over to form the last block. In this case, the last block is formed with these thirty left-over words to which, for example, seventy words of zero binary value, i.e. composed solely of zeros, are added.

To avoid this device, matters may be arranged such that the number of words in each block is an exact divisor of the number of words in the message, so that the set of blocks will contain only words coming from the original message. This solution has the drawback that the processing circuits will have to count the total number of words in the message before forming blocks to determine what the number of words per block should be. Thus, the processing circuits will have to know in advance the optimum number of words in each block, and if this optimum number is not a divisor of the total number of words in the message, the processing circuits must determine what lower-value divisor must be used. It will thus been seen that this solution is slightly more cumbersome and difficult to implement; it is possible, however.

Figure 5:
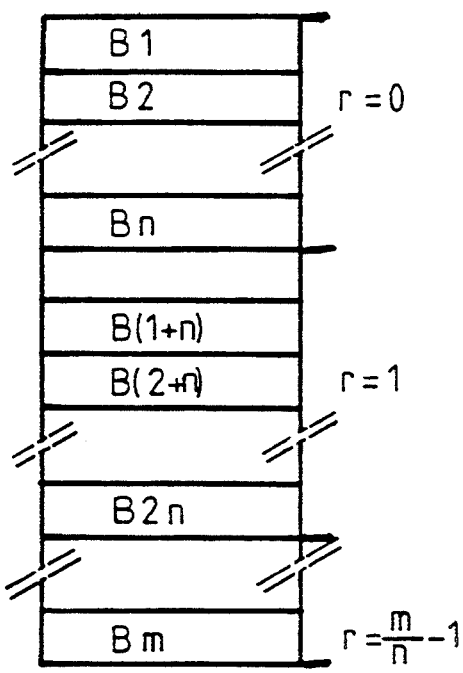
FIGS. 5 and 6 are blocks of a message which are divided for forming modules.

FIG. 5 illustrates how the blocks are divided inside the message, and how the processing circuits calculate the first signatures, or how the processing circuits of the portable object interlink them when they carry out the checking calculations.

FIG. 5 shows a set of m blocks numbered b1 to bm. Each block may, as described above.., be composed of a single binary word or several binary words associated with each other. By associating a given number of blocks with each other, a module is obtained which can then serve as a basis for calculating a signature, as described above.

If message P is divided into m blocks numbered B1 to Bm, it is possible to form m/n modules of n blocks, each such that module Mi of rank i is composed of blocks with rank i, i+n, i+2n, and so forth, up to i+rn with $1 \leq i \leq n$ and $0 \leq r \leq m/n - 1$.

Thus, the first module will be composed of blocks B1, B1+n, B1 +2n, ..., B1+rn adjoining each other.

The number n must be determined such that the signature calculation and checking times are not too long, and that, as far as possible, each module contains exclusively information coming from the original message, or the message to be checked.

If n is not an exact divisor of the number of blocks, certain modules can contain information other than information on the messages on which the signatures are to be calculated. In fact, certain modules would have to be supplemented with binary zeros or ones.

This is why, preferably, the number n of blocks in each module is chosen such that n is a divisor of the total number of blocks in the message.

Regardless of the number of words in each block and the number of blocks in each module, we can see that the interlinking of the blocks in the modules and the signatures are quite independent of the actual structure of the message, which is particularly important when the message is a program on which integrity checks are to be made. A change in one part of the message, by reason of this interlinking, may appear in several signatures so that the probability of detecting modifications is increased because several modules may have been altered from their original state. Thus the modifications have spread somewhat through a non-trivial number of modules. Hence, this arrangement allows the number of signature-checking calculations to be reduced by comparison to the arrangement in which each module is considered to be composed of a certain number of blocks in a sequence through the message.

Figure 6:
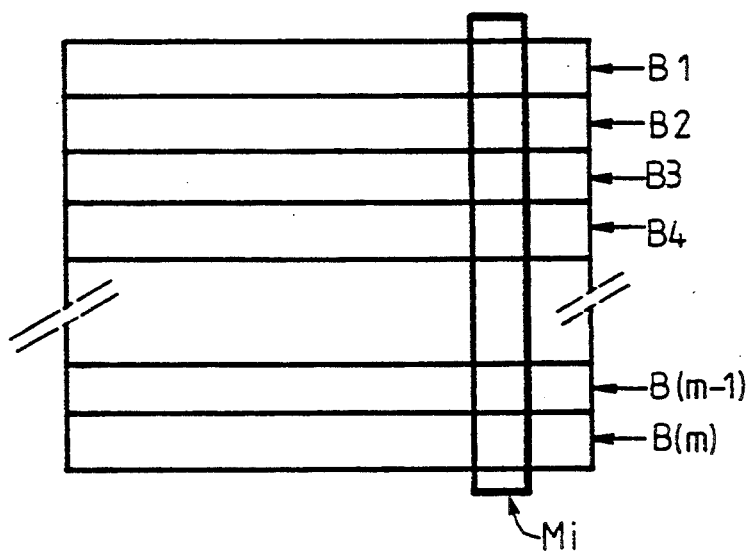

Another way of forming the modules, illustrated in FIG. 6, consists, similarly to the method described above, of dividing the total message into blocks B1, B2, B3, . . . Bm each having a given number of bits or words. Block B1 for example is composed of the first k binary words of the message, block B2 is composed of the next k words, and so forth to the end. Here again, the number k is chosen such that for example it is a divisor of the number of words in the message, so that the last word formed in the arrangement made prior to signature calculation, before memorization in the portable object, is composed solely of words belonging to the original message, and so that one need not resort to completing the block with insignificant information.

So, each block has a given number of bits, each of the bits being findable by its rank in the block, and formation of a module consists of combining one or more bits of given ranks in a block with the bit or bits of the same rank in the other blocks; then the signatures can be calculated using the modules thus formed.

Thus, assuming that one bit was taken from each block to form the modules, a first module would be formed from the first bit of the first block, the first bit of the second block, and so forth up to the first bit of the last block in the message. A second module would be formed from the second bit in the first block, the second bit in the second block, and so forth.

Each module would thus be composed of an information string across the message in question, so that it would be very difficult for a consistent alteration of part of the message to go undetected when the signatures were recalculated, whatever the number of signatures recalculated and compared to the original number of signatures. In general, instructions, whether programs or data, are written in sequence longitudinally, and the slightest consistent change in the program or data would result in a different cross string almost impossible to handle simultaneously. Also, this solution allows the number of signatures that have to be recalculated and compared to the corresponding original signatures when the message is checked, to be reduced still further.

Rather than choosing a cross string as defined above, a module could be formed from a pseudo-cross string, taking a given number of bits randomly from each block at the time each signature is calculated before memorization. This makes it possible to take the first bit from the first block and associate it with the last bit of the second block, then associate with it a bit of a different rank in the third block, and so forth. Of course, such a combination requires the use of a random reference number, chosen for example at the time the signature is calculated before memorization. This random reference number is used by the processing circuits to determine what sequence of bits is to be considered, and must be stored in the memory circuits of the portable object so that, at the time of checking, the processing circuits know how they must perform the distribution to form modules from the message they are checking.

Moreover, any other type of variant for interlinking the blocks to make modules, or interlinking words or even bits to make up blocks, may be considered. In particular, rather than following a logical sequence in interlinking the words or blocks, the linkage of the words in making up a block or blocks to make up a module may be random. Here, for example, the processing circuits, before forming the modules with a view to calculating their signature(s) for memorization, must determine how the modules are formed, and the parameters used to form the modules must be stored so that checks can be performed later. The processing circuits can be thought of as creating a sequence of n random numbers, where n corresponds to the number of blocks in each module, the message contains a number of modules m, and the sequence of random numbers V1, V2, V3, . . . Vn allows determination from a block constituting the first block of a module, of what the other blocks in this module will be.

In this case, a record must be kept of the random number sequence used so that tile modules can be reconstructed from the message to be checked.

Although the use of a secret key is preferable to securitize checking, there are cases where this key is unnecessary, whether or not the message is divided into modules, and serves to create one or more separate signatures. It does provide greater security however, since it prevents two different portable objects used to calculate the signatures in one and tile same message from containing identical signatures, since the secret key contained in each of the portable objects is different. This limits the risk of tampering in the case where a hacker observes what is happening with a message such as a program, and attempts to defeat the signature checking means. The use of a secret key is particularly important when the program is to be transferred from one person to another, for example. However, when calculation of the signature or signatures of a message is required by an end user with a view to memorization for later checking, it is not necessary for the portable object used for checking to contain a secret key. The message signature can be obtained merely by converting the total data it contains, or data taken in separate modules, with the aid of an algorithm so that each signature is a simple picture of the data used to calculate it. In the case where the end user wishes to be able to check the integrity of his data storage medium in the course of its use, he has no interest in trying to defeat the system. In such a case, a signature may result from merely compressing the information.

Calculation of a signature covering a message or message part would be a function only of the message or message part which had been subjected to the algorithm in question.

A portable object for calculating signatures with a view to signature checking will thus not, as is the case in FIG. 3, include a memory area 10 incorporating secret key K, but may contain one or more memory areas 10 each containing a signature S1, S2, Sm and may contain a processor with processing circuits 11 for implementing an algorithm A.

As a result, generation of a signature such as that described with regard to FIG. 2 would no longer involve the use of secret key K with each intermediate operation required by signature calculation.

A system for implementing the invention has a portable object 1 having at least one memory area 10 for memorizing at least one program signature, and processing circuits 11 memorizing an algorithm 12, in order at least to recalculate signatures after at least one original signature has been written. The fact that recalculation is carried out inside the processing circuits of the portable object prevents an outside observer from seeing the value of the recalculated signature, even if this observer knows the signature initially calculated, with a view to introducing it into the memory of the portable object, when said memorized signature had been calculated by processing circuits external to the portable object, for example to avoid over-lengthy calculation times.

The processing circuits of the portable object thus contain an algorithm or calculation program A that at least converts a message M whose integrity is to be checked, and the memory can also contain a key K if still greater security is desired. In addition, in the case where the memory of the portable object contains a large number of signatures each belonging to a different module of an initial message, the processing circuits of the portable object must be arranged such that they can perform the check on a number of modules smaller than the initial number, to reduce calculation time. Also, the processing circuits must be able to reconstitute the modules of the message to be checked, in the same way that they were constituted when the signatures were calculated and memorized.

Of course, the memory area in which the signatures are memorized is a non-volatile memory area.

Also, as indicated above, portable object 1 cannot function alone, but must be combined with other means 2 for constituting a system to implement the process of the invention. In particular, interface circuits must be constituted between the portable object and the computer, or the processing device of the program or the data whose integrity is to be checked. It is through this processing device or this computer that the information to be checked, like the information of which the original message is composed, are processed in the portable object following a dialog between the processing circuits of the portable object and the processing circuits of the associated processing device. Among others, the keyboard that generally exists on processing devices, or other data entry means (mouse, touch screen, etc.) can be used to establish the dialog with the portable object, particularly when inputting confidential access keys or identifiers corresponding to the messages whose integrity is being checked against original messages.

The interface circuits can be incorporated directly into the processing device or computer, or they can be located outside and connected by a link. Of course, a connector is provided between the portable object and the interface or coupling circuits.

When the system is used for a check, in the case where a single signature covering all of the original message has been memorized, the processing circuits of the portable object pick up all of the message whose integrity is to be checked, and calculate the signature of this message, employing the algorithm they contain, they check whether or not the recalculated signature matches the stored signature. This applies to short messages.

However, when the initial message has been divided into several modules because it is relatively long, and as a result several signatures have been memorized in the memory of the portable object, the processing circuits of the latter will determine, if this has not been predetermined, a number p of modules to be signature-checked, and their serial number(s). Using their serial numbers, they then reconstitute the modules to be signature-checked in the same way that the modules supposed to match in the original message were constituted when all the signatures were precalculated.

Preferably, in order to prevent a hacker from finding out what part of the message is being used for signature check calculation, the entire message is picked up by the processing circuits of the portable object, and sorting only takes place inside this object. Of course, if the message is very long, far longer than the memory capacity of the portable object, the processing circuits may confine themselves to reading the data in the message to be checked as they go by, and to using only the data serving as a basis for the signatures to be checked.

Also, as stated above, one and the same card may contain signatures associated with several programs. To distinguish these signatures, a check area may be provided in the portable object containing information on the identity of each program of which at least one signature has been memorized, with this check area also indicating to the processing circuits the memory addresses at which the signatures relating to a given original message are located. This may be a serial number or any other type of information allowing identification of the message to be compared. In such a case, at the time a check is made, the system prompts the user for the number or identity of the message to be checked.

Finally, in an improved variant, provision is made that if a message is intentionally changed for updating purposes, each corresponding signature memorized in the portable object can be updated. In this case, under the user's control, complete rewriting of the new signatures corresponding to the changed message can take place either in another memory area of the portable object or in the same area, which is then of the EEPROM type for example, i.e. it is erasable anti reprogrammable electrically under the control of the circuits in the portable object. This is fully within the range of the individual skilled in the art, since portable objects of the memory card type and electronic microcircuits generally incorporate memories of this type, and a connector for programming or erasing certain memory areas can be provided at the connectors between these portable objects and an outside system, in addition to the connectors necessary for power supply and data transfer. In other instances, the programming voltages are furnished by the portable object itself. However, in each case, erasure and rewriting of new signatures into the memory are done selectively, and affect only the areas to be changed.

The invention is thus particularly advantageous since it allows the integrity of a message consisting of a program and/or data memorized in a data-processing storage medium to be ensured simply, securely, and relatively inexpensively, even though messages may have been loaded from an original and may have been changed either following an intrusion on-site or remotely through a transmission line.

Of course, modifications may be made to the process and system for its implementation without thereby departing from the scope of the present invention.

We claim:

1. A method for verifying integrity, against an original message (M), of a subsequent message containing information, the method including the steps of:
   storing the original message in an electronic portable object (1) having a processing circuit (11) and at least one non-volatile memory area (10) accessible only by said processing circuit (11);

storing a secret key (K) in the at least one non-volatile memory area (10) of the electronic portable object;

using the processing circuit (11) and the secret key (K) to apply an algorithm (A) to at least a part of the original message to calculate at least one original signature (S1, S2, . . . Sm) of the original message within the electronic portable object;

storing each original signature (S, S1, S2, . . . Sm) of the original message in said at least one non-volatile memory area (10) of the electronic portable object under control of the processing circuit (11);

verifying the integrity of the subsequent message against the original message by executing the algorithm (A) within the processing circuit (11) of the electronic portable object, the processing circuits (11) having inputs of the subsequent message and the secret key (K), to calculate at least one subsequent signature of at least one part of the subsequent message to be verified;

using the processing circuit (11) of the portable object to compare, within the electronic portable object, each subsequent signature calculated from the subsequent message with each original signature from the memory area (10) of the portable object; and displaying to a user using a computer system external to the portable object, whether or not each subsequent signature calculated from the subsequent message is in matching relationship with a respective original signature calculated from a respective original message, wherein algorithm (A) is a calculation algorithm which takes into account, for calculation of each original and subsequent signature, at least one secret key (K) stored in the memory area (10) of the portable object, accessible only within the electronic portable object and under control of said processing circuits (11).

2. The method according to claim 1, wherein the key (K) is used to calculate at least one original signature based upon at least part of the original message with a view to memorization of said at least one original signature, wherein the key (K) is used to calculate at least one subsequent signature based upon a subsequent message with a view to verification of the at least one subsequent signature, wherein the key (K) is determined at the time of calculation of said at least one original signature by the processing circuits of the portable object, and wherein the key (K) is stored in the memory area of the portable object under control of the processing circuit (11) thereof at the same time the at least one original signature is stored in the memory area (10) of the portable object.

3. The method according to claim 1 wherein the key (K) is used when the at least one subsequent signature is memorized upon verification, the key (K) being stored in memory area ( 10 ) of the portable object such that the key (K) is accessible only under control of the processing circuits (11) of the portable object.

4. The method according to claim 1 wherein calculation of at least one original signature from the original message, with a view to memorization of the at least one original signature in the memory area of the portable object, is carried out by circuits (2) external to the processing circuits (11) of the portable object, in which a circuit conversion algorithm (A) is stored.

5. The method according to claim 1 wherein the step of using the processing circuit (11) and the secret key (K) to apply an algorithm (A) further comprises the steps of dividing the original message into several modules (M1, M2, . . . Mm), calculating one signature (S1, S2, . . . Sm) of each of these modules and memorizing each of the module signatures (S1, S2, . . . Sm) in the memory area (10) of the portable object in order to serve as references for later verifications; and in order to verify the integrity of a subsequent message against the original message., the processing circuits compile a given number of modules (p) in the subsequent message to be verified, then the signature of each of these (p) modules is calculated and compared with the signature of the corresponding original signature module stored in the memory area (10) of the portable object.

6. The method according to claim 5 wherein the number (p) of subsequent message modules on which verification is conducted is less than a total number (m) of modules comprising the original message in order to make subsequent message signature calculation time of the signature to be verified less than time required to calculate the signatures for all subsequent message modules; and the number (p) is chosen as a function of the total number (m) of subsequent message modules such that a desired probability of detecting a subsequent message alteration is provided.

7. The method according to claim 5 wherein the number (p) of subsequent message modules to be verified is calculated at the time of a subsequent message verification by the processing circuit of the portable object as a function of the total number (m) of modules contained in the original message in order to provide a desired probability of detection of subsequent message alteration when the subsequent message signatures are verified.

8. The method according to claim 5 wherein, to determine on which (p) subsequent message modules the signature verification will be made, the processing circuits of the portable object make (p) successive choices of different random numbers, each random number determining a subsequent message module to be verified.

9. The method according to claim 5 further comprising the steps of:

determining a subset of modules of the original message against which subsequent message signature verification will be made, the determining step comprising;

choosing by the processing circuit of the portable object a binary random number (a) of length (m) expressed in bits, the length of the random number directly representative of the number of modules (m) in the original message, the random number having (p) bits of a certain binary value (1 or 0), the remaining (m-p) bits having a complementary value, each bit of the random number being assigned a different serial number, the subsequent message modules to be signature-verified determined by the serial numbers of the (p) bits taken from the (m) bits in the random number.

10. The method according to claim 5 wherein the original message is comprised of a sequence of bits identified by position in tile original message, wherein using the processing circuits of the portable object, the several modules (M1, M2, . . . Mm) of the original message are compiled and the signature of each of the several original message modules are calculated before being memorized by the processing circuits of the portable object, each of the original message modules compiled by the steps of:

selecting a certain number of original message bits according to one of a predetermined rule and a rule created by the processing circuits of the portable object, to form an original message module, and storing the rule used to form each module from the original message in the portable object in border to reconstitute, from a subsequent message to be verified, the modules of the subsequent message following the same rule used for forming the modules from the original message.

11. The method according to claim 5, to calculate the signature of the at least one original message module (M1, M2, ... Mm) before memorization, and to calculate the signature of at least one subsequent message module to verify the integrity of the subsequent message consisting of binary words, further comprising the steps of:

the portable object processing circuit forming a plurality of blocks (B1, B2, ... Bn), each block consisting of data derived from the subsequent message, each datum within each block having a unique address; and the portable object processing circuits forming the at least one subsequent message module by using at least one bit from each of the plurality of blocks (B1, B2, ... Bn) according to a given rule.

12. The method according to claim 11 wherein forming of the plurality of blocks is carried out by taking the data in an order in which the data appears when the subsequent message is read.

13. Apparatus for verifying integrity, against an original message (M), of a subsequent message by calculating an original signature (S) from the original message (M) using a conversion algorithm (A), and comparing the original signature (S) with a subsequent signature calculated from the subsequent message, the apparatus comprising:

at least one portable object (1) including a processing circuit (11) for implementing the conversion algorithm (A) to calculate at least one one of the signatures from at least one message, means (10) for memorizing within the portable object the at least one signature calculated from the at least one message by the processing circuit (11), a secret key (K) stored within the means (10) for memorizing for use as a data input to the algorithm (A) when the at least one signature is calculated by the processing circuit (11), connecting means for connecting said processing circuit (11) to an external device (2) for execution of the subsequent message by the device (2), and comparing means in electrical communication with the processing circuit (11) and the means for memorizing for comparing the original signature (S) calculated by the processing circuit (11) with the subsequent message signature calculated by the processing circuit (11); and means for informing a system user via the external device (2) of a result generated by the portable object comparing means, the processing circuit (11) of the portable object calculating at least one subsequent signature of a subsequent message presented thereto for integrity verification, and the comparing means comparing the subsequent signature calculated for verification with an original signature memorized in the portable object means (10) for memorizing.

14. The apparatus according to claim 13 wherein the means (10) for memorizing of the portable object include means for memorizing rules by which each original and subsequent signature is created from a respective original and subsequent message by the processing circuit within the portable object.

15. The apparatus according to claim 13 wherein each subsequent signature corresponds to one of several original signatures memorized inside the means (10) for memorizing of the portable object, and the portable object includes means for determining correspondence between one of the several original signatures and a subsequent signature.

16. The apparatus according to claim 13 wherein the means (10) for memorizing of the portable object includes an erasable reprogrammable memory under control of the processing circuits of the portable object so that, when an intentional modification of an original message occurs, at least one signature after the intentional modification is memorized in the means (10) for memorizing of the portable object.

17. A method for verifying integrity, against an original message (M), of a subsequent message containing information, the method including the steps of:

dividing the original message into a total number (m) of modules (M1, M1, ... Mm);

using processing means to apply an algorithm A to each module of the original message to calculate a respective signature (S1, S2, ... Sm) of each module;

using an electronic portable object having a processing circuit (11) and memory means including one non-volatile protected memory area (10) accessible only by said processing circuit, and storing said signatures in said protected memory area and said algorithm in said memory means;

and verifying the subsequent message in the portable object by:

selecting, in the subsequent message, a partial number (p) of modules less than said total number (m) of modules, said partial number being such that the a probability of detecting an alteration in the subsequent message, by considering only said partial number of modules, has a predetermined value;

using said processing circuit to apply said algorithm to each selected module to calculate a respective signature;

selecting in said protected memory area the signatures of those modules of the original message which correspond to the selected modules of the subsequent message and comparing said signatures of the original message with the signatures of the subsequent message; and let the portable object send an output signal indicating whether or not integrity between original and subsequent messages is met depending on whether or not said signatures of the original message are in matching relationship with the respective signatures of the subsequent message.

18. The method according to claim 17 further comprising the step of determining which (p) modules of the subsequent message on which the signature verification will be made by successive choices of different random numbers, each random number determining which module is to be verified.

19. The method according to claim 18 further comprising the steps of:
- determining which modules of the message that the signature verification will be made, selecting the modules from the (m) modules contained in the original message,
- choosing a binary (a) of length (m) expressed in bits such that the length of a random number chosen is directly representative of the number of modules in the original message;
- wherein the random number is from a code (p) out of the (m) bits contained in the random number, bits of the code (p) that have a certain binary value (1 or 0) while the remaining (m-p) bits have a complementary value; each bit of the random number being marked with a different serial number; and the number of modules to be signature-verified being determined by the serial number of the (p) bits taken from the (m) bits in the random number.

20. The method of claim 17 wherein a message is composed of a sequence of bits labelled by their addresses according to positions said bits occupy in the message, and the modules (M1, M2, ... Mm) are created from the original message in order to calculate the signature of each of these modules before it is memorized by the portable object, as follows:
- each module is formed by:
  - taking a certain number of message bits according to a predetermined rule; and
  - storing the rule used to form each module from the original message in the portable object in order to reconstitute, from a message to be verified, the modules of the message following the same rule used for forming the modules from the original message.

21. The method according to claim 17 wherein the message is organized in the form of binary words, and, in order to form said original message modules and said subsequent message modules;
- forming a plurality of blocks (B1, B2, ... Bn), each block containing data such that each datum contained in a block is indexed according to the positions of the bits of which this datum is composed; and for forming a given module, taking at least one bit from each of the blocks according to a given rule.

22. The method according to claim 21 wherein grouping of the data to form blocks is carried out by taking the data in the order in which they appear when the message is read.

* * * * *

UNITED STATES PATENT AND TRADEMARK OFFICE
CERTIFICATE OF CORRECTION

PATENT NO. : 5,442,645
DATED : August 15, 1995
INVENTOR(S) : Michel Ugon et al

It is certified that error appears in the above-indentified patent and that said Letters Patent is hereby corrected as shown below:

Column 4, line 30, "is of" should read --is--.

Column 4, line 31, "are the bits" should read --all the bits--.

Column 5, line 16, "keying" should read --key,--.

Column 5, line 61, "B f" should read --Bf--.

Column 7, line 13, "to the same" should read --to one and the same--.

Column 8, line 28, "the key" should read --the latter--.

Column 9, line 30, "i.e. as soon" should read --i.e., as soon--.

Column 12, line 33, "above..," should read --above,--.

Column 16, line 35, "erasable anti reprogrammable" should read --erasable and reprogrammable--.

Column 17, line 38, "circuits" should read --circuit--.

Column 17, line 61, "circuits" should read --circuit--.

Column 17, line 67, "circuits" should read --circuit--.

Column 18, lines 41-42, "circuits" should read --circuit--.

Column 18, line 66, "tile" should read --the--.

UNITED STATES PATENT AND TRADEMARK OFFICE
CERTIFICATE OF CORRECTION

PATENT NO. : 5,442,645
DATED : August 15, 1995
INVENTOR(S) : Michel Ugon et al

Sheet 2 of 2

It is certified that error appears in the above-indentified patent and that said Letters Patent is hereby corrected as shown below:

Column 19, line 3, "circuits" should read --circuit--.

Column 19, line 11, "in border to" should read --in order to--.

Column 19, line 28, "circuits" should read --circuit--.

Column 20, line 4, "in the portable object means" should read --in the means--.

Column 20, line 22, "circuits" should read --circuit--.

Signed and Sealed this

Third Day of September, 1996

*Attest:*

BRUCE LEHMAN

*Attesting Officer      Commissioner of Patents and Trademarks*